United States Patent
Kiviranta et al.

(10) Patent No.: US 11,709,241 B2
(45) Date of Patent: Jul. 25, 2023

(54) RADAR

(71) Applicant: Teknologian tutkimuskeskus VTT Oy, Espoo (FI)

(72) Inventors: Markku Kiviranta, Oulu (FI); Ilkka Moilanen, Oulu (FI); Henna Paaso, Oulu (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 105 days.

(21) Appl. No.: 16/962,930

(22) PCT Filed: Feb. 5, 2019

(86) PCT No.: PCT/FI2019/050081
§ 371 (c)(1),
(2) Date: Jul. 17, 2020

(87) PCT Pub. No.: WO2019/158807
PCT Pub. Date: Aug. 22, 2019

(65) Prior Publication Data
US 2021/0132207 A1    May 6, 2021

(30) Foreign Application Priority Data
Feb. 14, 2018    (FI) ...................... 20185130

(51) Int. Cl.
*G01S 13/00* (2006.01)
*G01S 7/35* (2006.01)
(Continued)

(52) U.S. Cl.
CPC ............ *G01S 13/003* (2013.01); *G01S 7/352* (2013.01); *G01S 13/584* (2013.01); *G01S 13/87* (2013.01); *G01S 13/931* (2013.01)

(58) Field of Classification Search
CPC ...... G01S 13/003; G01S 7/352; G01S 13/584; G01S 13/87; G01S 13/931
(Continued)

(56) References Cited

U.S. PATENT DOCUMENTS 6,677,900 B1    1/2004   Thouvenel et al.
6,721,678 B1 *  4/2004   Zhang .................. G01S 13/951
                                                            702/145
(Continued)

FOREIGN PATENT DOCUMENTS

CN    111398948 B  * 12/2021   ........... G01S 13/581
EP      1515488 B1  * 10/2008   ............. G01S 7/021
(Continued)

OTHER PUBLICATIONS

BassemIbrahimetal.:("Designandimplementationofsynchronizationandcellsearchalgorithmsforl.TEreceiver",32ndNationalRadioSciencéConference,Mar. 24, 2015(Mar. 24, 2015),pp. 313-322,DOI:10.1109/NRSC.2015.7117844,ISBN:978-1-4799-9945-3,XP032781762) (Year: 2015).*

(Continued)

*Primary Examiner* — Nuzhat Pervin
(74) *Attorney, Agent, or Firm* — Ziegler IP Law Group LLC

(57) ABSTRACT

A radar including an interface configured to receive a frequency estimation output and a synchronization signal correlation output from a radio communication device; and a processing block configured to use the received frequency estimation output and synchronization signal correlation output for velocity and range estimation.

18 Claims, 5 Drawing Sheets

(51) Int. Cl.
  *G01S 13/58* (2006.01)
  *G01S 13/87* (2006.01)
  *G01S 13/931* (2020.01)
(58) Field of Classification Search
  USPC .......................................................... 342/70
  See application file for complete search history.

(56) References Cited

U.S. PATENT DOCUMENTS

| | | | | |
|---|---|---|---|---|
| 6,879,878 | B2* | 4/2005 | Glenn | G05D 1/0282 |
| | | | | 342/353 |
| 7,120,439 | B2* | 10/2006 | Freiha | H04B 17/318 |
| | | | | 455/238.1 |
| 8,018,371 | B1* | 9/2011 | Paschen | G01S 13/003 |
| | | | | 342/195 |
| 8,454,528 | B2* | 6/2013 | Yuen | A61B 5/0205 |
| | | | | 600/407 |
| 8,711,038 | B2* | 4/2014 | Reede | G01S 5/0289 |
| | | | | 342/463 |
| 9,002,378 | B2* | 4/2015 | Levin | H04W 4/029 |
| | | | | 342/461 |
| 9,100,278 | B2* | 8/2015 | Beauregard | G01S 11/10 |
| 9,397,820 | B2* | 7/2016 | Schulz | H04K 3/226 |
| 9,490,533 | B2* | 11/2016 | Sanford | H01Q 15/14 |
| 9,543,635 | B2* | 1/2017 | Schulz | H01Q 19/12 |
| 10,237,101 | B2* | 3/2019 | Noda | H04L 27/0014 |
| 10,281,575 | B2* | 5/2019 | Rajendran | G01S 13/18 |
| 2004/0066331 | A1* | 4/2004 | Poullin | G01S 7/414 |
| | | | | 342/111 |
| 2005/0041746 | A1* | 2/2005 | Rosen | H04B 1/7163 |
| | | | | 375/242 |
| 2005/0084031 | A1* | 4/2005 | Rosen | H04B 1/69 |
| | | | | 375/295 |
| 2005/0084033 | A1* | 4/2005 | Rosen | H04L 27/2601 |
| | | | | 375/295 |
| 2005/0107096 | A1* | 5/2005 | Freiha | H04B 17/318 |
| | | | | 455/456.6 |
| 2007/0121678 | A1* | 5/2007 | Brooks | H04N 21/235 |
| | | | | 348/E7.07 |
| 2011/0287778 | A1* | 11/2011 | Levin | G01S 5/0294 |
| | | | | 342/461 |
| 2012/0307820 | A1 | 12/2012 | Tomatis et al. | |
| 2014/0106776 | A1* | 4/2014 | Levin | H04W 64/006 |
| | | | | 455/456.1 |
| 2017/0023672 | A1* | 1/2017 | Morrison | G01S 13/56 |
| 2017/0307753 | A1* | 10/2017 | Harris | G01S 13/34 |
| 2018/0031673 | A1* | 2/2018 | Kim | H04B 1/04 |
| 2018/0031697 | A1* | 2/2018 | Harris | G01S 7/023 |
| 2018/0088229 | A1* | 3/2018 | Rajendran | G01S 13/18 |
| 2018/0231652 | A1* | 8/2018 | Rao | G01S 13/288 |
| 2019/0028309 | A1* | 1/2019 | Noda | G01S 1/00 |
| 2019/0285722 | A1* | 9/2019 | Markhovsky | G01S 1/042 |
| 2019/0383930 | A1* | 12/2019 | Samotsvet | G01S 13/584 |
| 2020/0295424 | A1* | 9/2020 | Sanford | H01P 7/06 |

FOREIGN PATENT DOCUMENTS

| | | |
|---|---|---|
| JP | 2003510579 A | 3/2003 |
| JP | 2004531701 A | 10/2004 |
| JP | 2014050102 A | 3/2014 |

OTHER PUBLICATIONS

AaronEversetal.:("AnalysisofanLTEwaveformforradarapplications",RadarConference,May 19, 2014,pp. 200-205,DOI:10.1109/RADAR.2014.6875584,XP032628110) (Year: 2014).*

QingWangetal.:("WaveformAnalysisofLTESignalforPassiveRadarApplication",in:"SeriousGames",Dec. 7, 2013,SpringerInterna-tional Publishing,Cham032682,XP055574002,ISSN:0302-9743,ISBN:978-3-642-38979-5,vol. 8351,pp. 632-642,DOI:10.1007/978-3-319-09265-2_64) (Year: 2013).*

PreetiKumarietal.:("IEEE802.11ad-basedRadar:AnApproachtoJointVehicularCommunication-RadarSystem",arXiv:1702.05833,Feb. 20, 2017,XP080747695) (Year: 2017).*

ChristianSturmetal.:("WaveformDesignandSignalProcessingAspectsforFusionofWirelessCommunicationsandRadarSensing",ProceedingsoftheIEEE,vol. 99,No. 7,Jul. 1, 2011,pp. 1236-1259,XP011367583,ISSN:0018-9219,DOI:10.1109/JPROC.2011.2131110) (Year: 2011).*

Japan Patent Office, Notification of ground of rejection, Application No. 2020542636, dated Nov. 1, 2022, 3 pages, English Translation, 3 pages.

Bassem et al. "C25. Design and Implementation of Synchronization and Cell Search Algorithms for LTE Receiver" 32nd National Radio Science Conference (NRSC 2015), Mar. 24-26, 2015, October university for Modern Sciences and Arts, Egypt, ISBN 978-1-4799-7723-9, 10 Pages.

Choi et al. "Millimeter-Wave Vehicular Communication to Support Massive Automotive Sensing" IEEE Communications Magazine, Automotive Networking and Applications, ISBN 0163-6804/16, Dec. 2016, 8 Pages.

Evers et al. "Analysis of an LTE Waveform for Radar Applications" ISBN 978-1-4799-2035-8/14, XP032628110, DOI: 10.1109/RADAR.2014.6875584,May 19, 2014, pp. 200-205, 6 Pages.

Evers et al. "Experimental Passive SAR Imaging Exploiting LTE, DVB, and DAB Signals" 2014 IEEE Radar Conference, XP032628197, DOI: 10.1109/Radar.2014.6875677,May 19, 2014, pp. 680-685, 6 Pages.

Farzad et al. "Clutter and direct signal cancellation in analog TV-Based passive radar" Faculty of Electrical and Computer Engineering, Yazd University, Journal of Radar, vol. 1, No. 2, Jan. 1, 2014, pp. 1-13, XP055574048, 14 Pages.

Finnish Patent and Registration Office, Search Report, U.S. Appl. No. 20/185,130, filed Sep. 24, 2018, 2 Pages.

Han et al. "Joint wireless communication and radar sensing systems-state of the art and future prospects" The Institution of Engineering and Technology, Published in IET Microwaves, Atennas & Popagation, 2013, vol. 7, Iss. 11, pp. 876-885, DOI: 10.1049/iet-map.2012.0450, 10 Pages.

Klock et al. "LTE-signal processing for Passive Radar Air Traffic Surveillance" The 18th International Radar Symposium IRS 2017, German Institute of Navigation-DGON, Jun. 28, 2017, XP033142224, DOI: 10.23919/IRS.2017.8008105, 24 Pages.

Kumari et al. "IEEE 802.11ad-Based Radar: An Approach to Joint Vehicular Communication-Radar System" IEEE Transactions on Vehicular Technology, vol. 67, No. 4, Apr. 2018, publication date Nov. 17, 2017, pp. 3012-3027, Chapter 3.3, 0018-9545, 16 Pages.

Notification of Transmittal of the International Search Report and the Written Opinion of the International Searching Authority, or the Declaration, Application No. PCT/FI2019/050081, dated Apr. 2, 2019, 17 Pages.

Sturm et al. "An OFDM System Concept for Joint Radar and Communications Operations" Proceedings of Vehicular Technology Conference, Apr. 26-29, 2009, 5 Pages.

Sturm et al. "Waveform Design and Signal Processing Aspects for Fusion of Wireless Communications and Radar Sensing" Proceedings of the IEEE, New York, vol. 99, No. 7, Jul. 1, 2011, XP011367583, ISSN: 0018-9219, DOI: 10.1109/JPROC. 2011.2131110, pp. 1236-1259, 24 Pages.

Wang et al. "OFDM Chirp Waveform Diversity for Co-Designed Radar-Communication System" University of Electronic Science and Technology of China, The 18th International Radar Symposium IRS 2017, Jun. 28-30, 2017, Prague, Czech Republic 978-7369-9343, 9 Pages.

Wang et al. "Waveform Analysis of LTE Signal for Passive Radar Application" Springer International Publishing Switzerland 2014, BNSDOCID; XP 55574002A_I, 12 Pages.

* cited by examiner

| LTE | 15 | 512 | 7.68 | 4.5/5.0 (90%) | 33.3 |
|---|---|---|---|---|---|
| LTE | 15 | 2048 | 30.72 | 18/20 (90%) | 8.3 |
| 5G NR | 15 | 4096 | 61.44 | 49.5/50 (99%) | 3.0 |
| 5G NR | 480 | 256 | 122.88 | 99/100 (99%) | 1.5 |
| 5G NR | 480 | 512 | 245.76 | 198/200 (99%) | 0.75 |
| 5G NR | 480 | 1024 | 491.52 | 396/400 (99%) | 0.40 |
| 5G NR | 480 | 2048 | 983.04 | 792/800 (99%) | 0.20 |
| 5G NR | 480 | 4096 | 1966.08 | 1584/1600 (99%) | 0.10 |

RADAR

TECHNICAL FIELD

The present application generally relates to radars. In particular, but not exclusively, the present application relates to joint communication and radar systems.

BACKGROUND

This section illustrates useful background information without admission of any technique described herein being representative of the state of the art.

Radar is an object-detection system that uses radio waves to determine range, angle or velocity of objects. Radar can be used to detect for example aircraft, ships, spacecraft, guided missiles, vehicles, weather formations and terrain. Radar is a key technology in early-warning and surveillance systems. For example the development of self-driving vehicles will increase the need for radar technology. There is also a need to communicate increased amounts of data (e.g. safety data and sensor data). There is ongoing development of joint communication and radar systems.

SUMMARY

Various aspects of examples of the disclosed embodiments are set out in the claims.

According to a first example aspect of the disclosed embodiments, there is provided a radar comprising
a. an interface configured to receive a frequency estimation output and a synchronization signal correlation output from a radio communication device; and
b. a processing block configured to use the received frequency estimation output and synchronization signal correlation output for velocity and range estimation.

In an example embodiment, the frequency estimation output is a first correlation result produced by a first correlator of the radio communication device, the first correlator being configured to correlate a received signal with itself.

In an example embodiment, the synchronization signal correlation output is a second correlation result produced by a second correlator of the radio communication device, the second correlator being configured to correlate a frequency corrected received signal with a predefined known signal.

In an example embodiment, the processing block is configured to calculate a range estimate based on a correlation peak of the synchronization signal correlation output.

In an example embodiment, the processing block is configured to calculate a velocity estimate based on the frequency estimation output at the moment of a correlation peak of the synchronization signal correlation output.

In an example embodiment, the radio communication device uses multi-carrier signals.

In an example embodiment, the radio communication device uses orthogonal frequency-division multiplexing, OFDM.

In an example embodiment, the radio communication device is a 4G or 5G communication device.

In an example embodiment, the synchronization signal is a predefined known signal.

In an example embodiment, the synchronization signal is a primary synchronization signal, PSS, of the radio communication device.

In an example embodiment, there is provided a joint communication and radar system comprising radar of the first aspect or any related embodiment.

In an example embodiment, there is provided a vehicle comprising radar of the first aspect or any related embodiment.

According to a second example aspect of the disclosed embodiments, there is provided a method in radar. The method comprises
a. receiving a frequency estimation output and a synchronization signal correlation output from a radio communication device; and
b. using the received frequency estimation output and synchronization signal correlation output for velocity and range estimation.

In an example embodiment, the method further comprises calculating a range estimate based on a correlation peak of the synchronization signal correlation output.

In an example embodiment, the method further comprises calculating a velocity estimate based on the frequency estimation output at the moment of a correlation peak of the synchronization signal correlation output.

According to a third example aspect of the disclosed embodiments, there is provided a computer program comprising computer code for causing performing the method of the second example aspect of the disclosed embodiments, when executed by an apparatus.

According to a fourth example aspect of the disclosed embodiments, there is provided a non-transitory memory medium comprising the computer program of the third example aspect of the present embodiment.

Different non-binding example aspects and embodiments of the disclosed embodiments have been illustrated in the foregoing. The embodiments in the foregoing are used merely to explain selected aspects or steps that may be utilized in implementations of the present embodiment. Some embodiments may be presented only with reference to certain example aspects of the disclosed embodiments. It should be appreciated that corresponding embodiments may apply to other example aspects as well.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DRAWINGS

Figure 1:
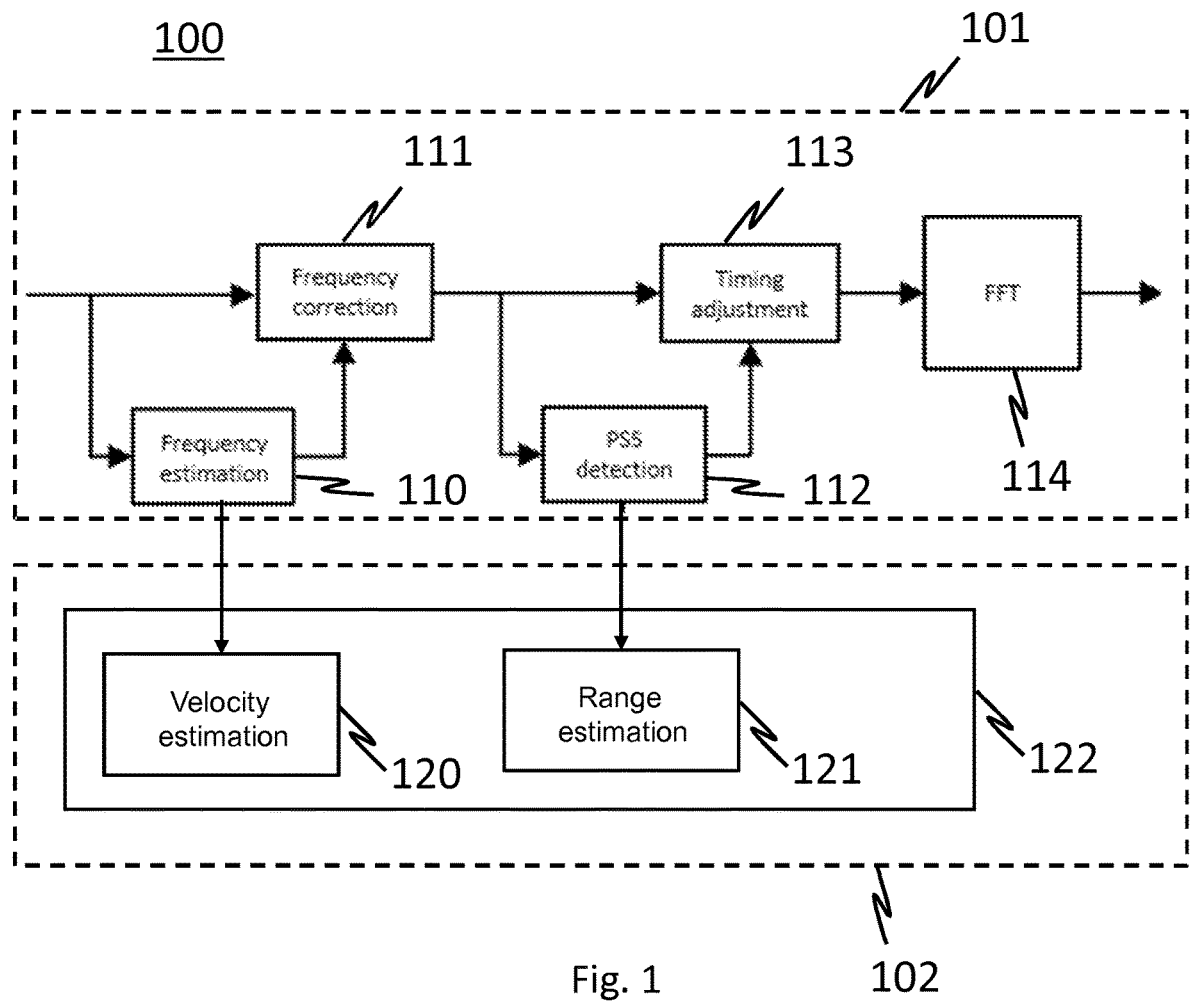
FIG. 1 shows a logical block diagram of a joint communication and radar system according to an example embodiment.

The disclosed embodiments and its potential advantages are understood by referring to FIGS. 1 through 8 of the drawings. In this document, like reference signs denote like parts or steps.

Various embodiments disclosed herein provide radar suited for joint communication and radar systems. Various embodiments are based on using hardware components of a radio communication receiver also for radar. More specifically, according to an embodiment, correlation estimators of the radio communication receiver are used for radar's range and velocity estimation. In an embodiment the radio communication system employs multi-carrier signals, such as orthogonal frequency-division multiplexing, OFDM, technology. The radio communication system may be for example a fourth generation, 4G, or a fifth generation, 5G, communication system. It is to be noted that these are only examples and other applicable communication systems are covered, too.

In an embodiment the physical and logical components of the radio communication receiver are used as such also for the purposes of radar estimations, i.e. changes in the radio communication receiver are not necessarily needed and the parameters defined in applicable communication standard (e.g. 4G or 5G standard) can be used as such without need to modify the parameters. In this way complexity of the communication system is not increased by inclusion of the radar.

In an embodiment, the same carrier is used for both communication and radar. Thereby it is possible to simultaneously sense the environment and exchange information.

According to an embodiment, the radar is suited for operating with a radio communication device that comprises in a receiver path a first correlator and a second correlator. The first correlator is configured to correlate a received signal with itself to produce a first correlation result. The first correlation result is used as frequency estimate for frequency correction. The second correlator is configured to correlate the frequency corrected received signal with a synchronization signal to produce a second correlation result. The second correlation result is intended for timing adjustment in the receiver. The radar according to an embodiment comprises an interface for interacting with the first and second correlators and for receiving the first and the second correlation results. The radar further comprises a processing block configured to use the received first and second correlation results for range and velocity estimation. In this way, a synchronization signal detection of the communication device is used also for radars range estimation and frequency estimation of the communication device is used also for radar's velocity estimation.

The synchronization signal may be any predefined known signal. In general, it is beneficial to use a signal that has good autocorrelation properties to achieve good range resolution in the radar.

The synchronization signal may be for example a primary synchronization signal, PSS, of 4G or 5G communication system. In general, and as an example, the PSS is a frequency domain sequence having good autocorrelation properties. However, frequency offset has a profound impact on the autocorrelation property and the PSS detection is sensitive to Doppler effect. Therefore, the frequency offset needs to be corrected before PSS detection. The PSS may be a Zadoff-Chu sequence of 4G or an m-sequence of 5G. The PSS may have zero cyclic autocorrelation at all nonzero lags.

Following example embodiments use the primary synchronization signal, but it is noted that some other known signal may be equally used.

In an embodiment, a synchronization signal correlation peak is conveyed from a synchronization signal detection block of the communication device to the radar. Likewise, output of a frequency estimation block of the communication device is conveyed to the radar. The radar then calculates the velocity estimate using the frequency estimate from the frequency estimation block of the communication device at the moment of the synchronization signal correlation peak. That is, the velocity estimate is based on uncorrected frequency estimate whereas range estimate is based on a correlation result calculated with the frequency corrected signal.

FIG. 1 shows a logical block diagram of a joint communication and radar system 100 according to an example embodiment. The system comprises a communication unit 101 and a radar unit 102. For the sake of simplicity only some logical blocks are shown in the communication unit 101 and in the radar unit 102. For example the communication unit 101 of FIG. 1 shows only a part of receiver path of the communication unit 101. The shown part of the receiver path comprises a frequency estimation block 110, a frequency correction block 111, a Primary Synchronization Signal, PSS, detection block 112, a timing adjustment block 113, and a Fast Fourier Transformation, FFT, block 114. The radar unit 102 comprises an interface configured to interact with the communication unit 101. Likewise the communication unit 101 comprises an interface configured to interact with the radar unit 102. In FIG. 1 these interfaces are depicted by arrows between the radar unit 102 and the communication unit 101. The radar unit 102 comprises a processing block 122 that comprises a velocity estimation block 120 and a range estimation block 121. It is to be noted that the velocity estimation block 120 and the range estimation block 121 are logically separate blocks, but in practice the operations may be performed using the same physical component.

The PSS detection block 112 of the communication unit 101 is configured to provide output to the range estimation block 121 of the radar unit 102 through the interfaces between the communication unit 101 and the radar unit 102. The frequency estimation block 110 of the communication unit 101 is configured to provide output to the velocity estimation block 120 of the radar unit 102 through the interfaces between the communication unit 101 and the radar unit 102.

In operation, the radar unit 102 receives output from the PSS detection block 112 and uses it to estimate range in the range estimation block 121. Additionally, the radar unit 102 receives output from the frequency estimation block 110 and uses it to estimate velocity in the velocity estimation block 120.

Figure 2:
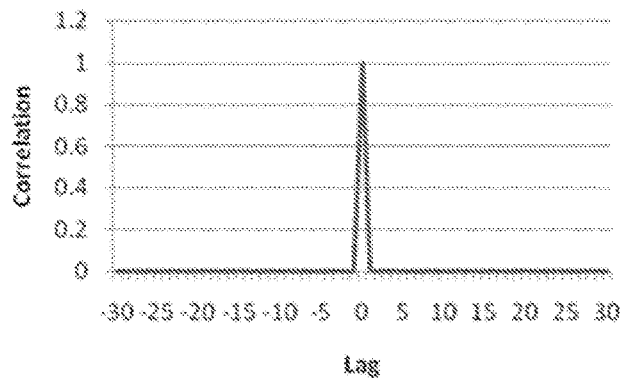
FIG. 2 shows an exemplary graph of a correlation peak of a primary synchronization signal.

FIG. 2 shows an exemplary graph of a correlation peak of a primary synchronization signal. In an embodiment the frequency estimate for the velocity estimation block 120 of FIG. 1 is taken at the moment of the PSS correlation peak.

Figure 3:
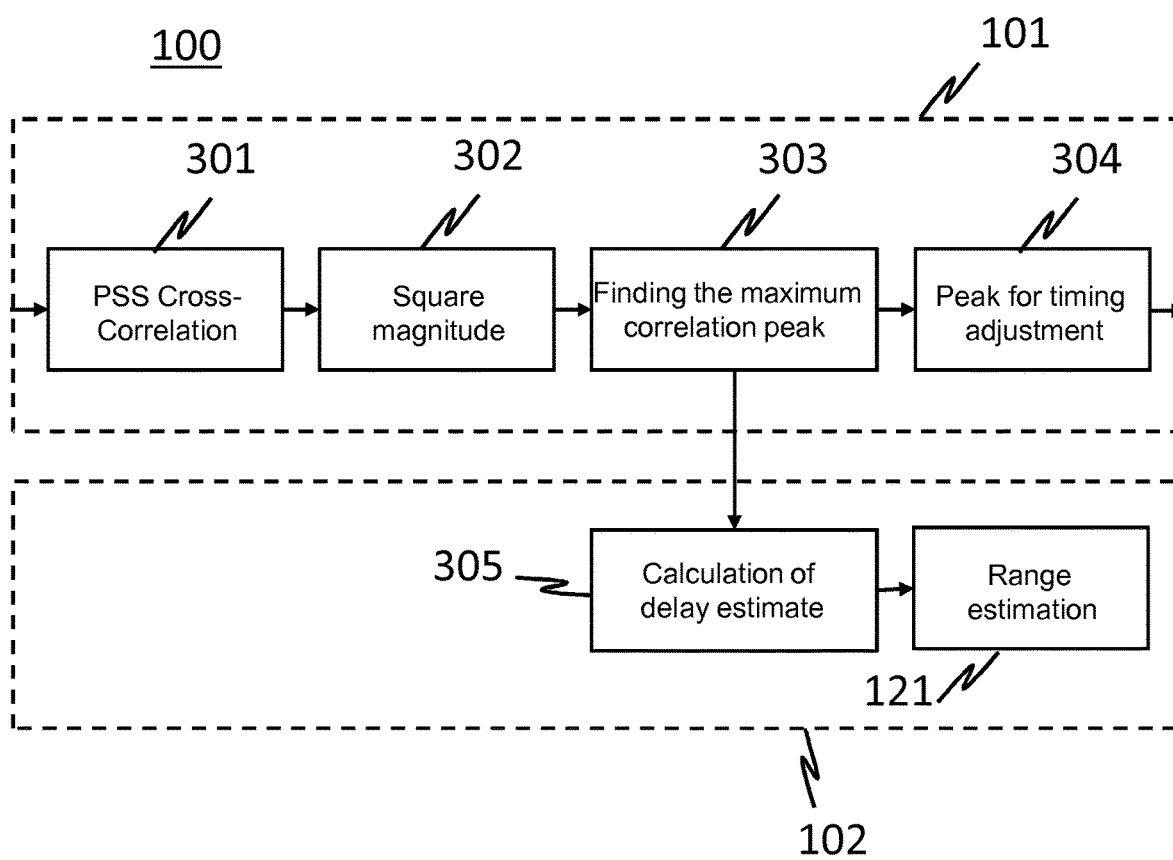
FIG. 3 shows logical blocks relating to range estimation according to an example embodiment.

FIG. 3 shows logical blocks relating to range estimation according to an example embodiment in a joint communication and radar system 100 according to an example embodiment. The system comprises a communication unit 101 and a radar unit 102. For the sake of simplicity only logical blocks relating to PSS detection are shown in the communication unit 101. The shown example comprises the following logical blocks in the communication unit 101: a PSS correlation block 301, a square magnitude calculation block 302, a correlation peak block 303 configured to find the maximum correlation peak, and a block 304 configured to provide the maximum peak for timing adjustment. The radar unit 102 comprises a delay estimation block 305 configured to calculate delay estimate and a range estimation block 121. The delay estimation block 305 and the range estimation block 121 may be implemented in the processing block 122 of FIG. 1.

In operation, the delay estimation block 305 receives maximum correlation peak from the correlation peak block 303 and calculates the delay estimate τ. The range estimation block 121 then calculates range R. Range R can be calculated as a.

$$R = \frac{c_0 \tau}{2}$$

b. where $c_0$=speed of light.

In an example 4G implementation, the PSS is mapped to the 3rd OFDM symbol in radio subframes 1 and 6 in time domain. In frequency domain the PSS is mapped into first 31 subcarriers either side of the DC subcarrier.

Figure 4:
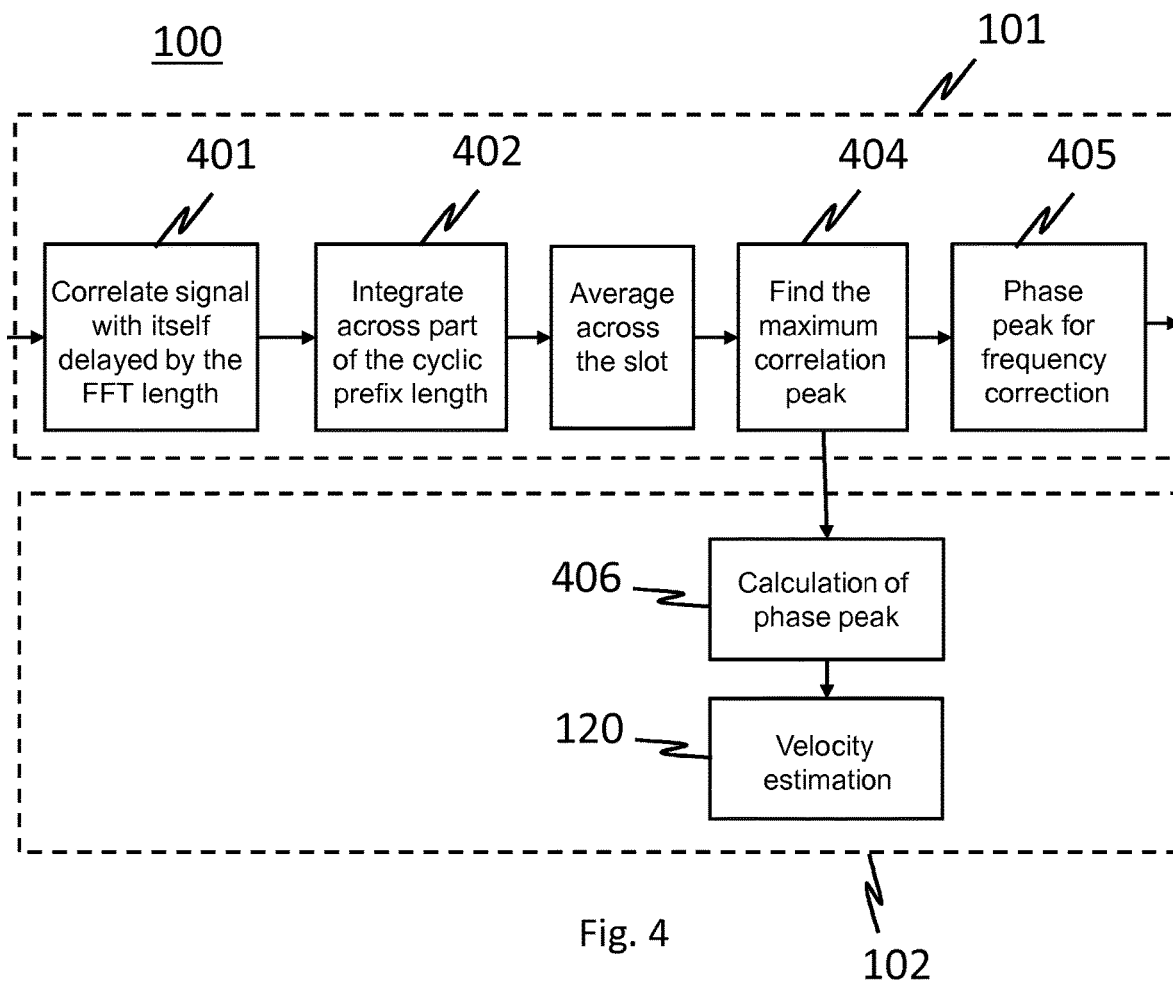
FIG. 4 shows logical blocks relating to velocity estimation according to an example embodiment.

FIG. 4 shows logical blocks relating to velocity estimation according to an example embodiment in a joint communication and radar system 100 according to an example embodiment. The system comprises a communication unit 101 and a radar unit 102. For the sake of simplicity only logical blocks relating to frequency estimation are shown in the communication unit 101. The shown example comprises the following logical blocks in the communication unit 101: a correlation block 401 configured to correlate the signal with itself delayed by the FFT length, an integration block 402 configured to integrate the signal across part of the cyclic prefix, CP, length, an averaging block 403 configured to take average across the slot, a correlation peak block 404 configured to find the maximum correlation peak, and a block 405 configured to provide phase of the maximum peak for frequency correction. The radar unit 102 comprises a phase estimation block 406 configured to provide phase of the maximum peak for velocity estimation and a velocity estimation block 120. The phase estimation block 406 and the velocity estimation block 120 may be implemented in the processing block 122 of FIG. 1.

In operation, the phase estimation block 406 receives information about the maximum correlation peak from the correlation peak block 404 and determines phase estimate φ. The velocity estimation block 120 then calculates relative velocity $v_{rel}$. Relative velocity $v_{rel}$ can be calculated as a.

$$v_{rel} = \frac{c_0 f_e}{2 f_c}$$

b. where $c_0$=speed of light,
c. $f_c$=carrier frequency, and
d.

$$f_e = \frac{\phi \Delta f}{\pi}$$

is the frequency estimate and
e. Δf=subcarrier spacing.

In an example 4G implementation, the frequency offset is measured by exploiting the cyclic prefix, CP, of the OFDM signal.

Figure 5:
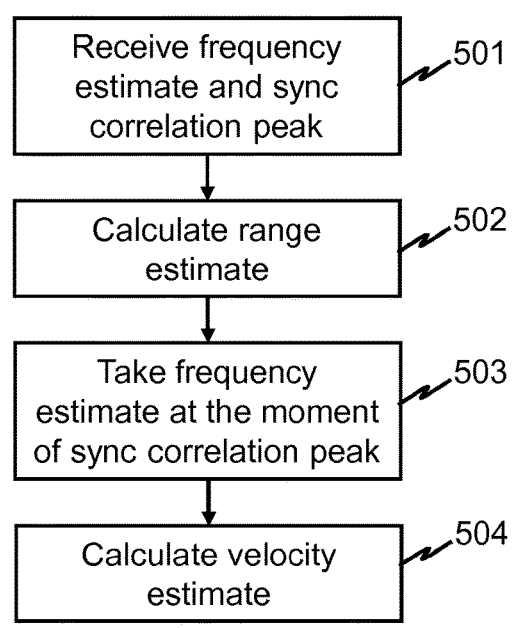
FIG. 5 is a flow chart illustrating a method according to an example embodiment.

FIG. 5 is a flow chart illustrating a method in radar according to an example embodiment. The method is intended for use in radar that is configured to co-operate with a communication receiver. At 501, information about frequency estimate and synchronization signal correlation peak from a communication receiver is received at the radar. It is noted that the synchronization signal correlation is performed for a frequency corrected signal. The synchronization signal correlation peak may be a PSS correlation peak. At 502, range estimate is calculated using the synchronization signal correlation peak. At 503, a frequency estimate of the communication receiver at the moment of the synchronization signal correlation peak is taken. At 504, velocity estimate is calculated using the frequency estimate from the phase 503.

Figure 6A:
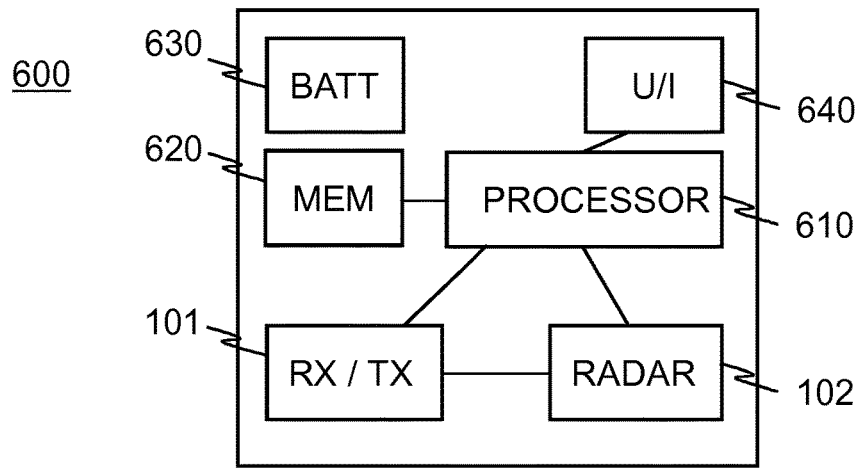
FIG. 6A shows a schematic block view of an apparatus according to an example embodiment.

FIG. 6A shows a schematic block view of an apparatus 600 according to an example embodiment. The apparatus 600 is a joint communication and radar device comprising a radio communication unit 101 and radar unit 102 according to any example embodiment as hereinbefore described. The apparatus may be a mobile device or some other handheld or portable communication device or a stationary communication device.

The apparatus 600 further comprises electronics configured to control the operations of the apparatus, to carry out calculations and to cause carrying out the steps of the method according to embodiments. The apparatus 600, in an embodiment, comprises a memory 620 and a processor 610. The processor 610 is, in an embodiment, configured to co-operate with the radio communication unit 101 and the radar unit 102 and to cause storing data into the memory 620. The processor 610 may be further configured to cause controlling of the operation of the apparatus and the radar 102 using a non-transitory computer program code stored in the memory 620. In an embodiment, the processor 610 is configured to carry out at least in part the calculations of the radar unit 102.

In a further embodiment, the apparatus 600 comprises a power source, such as a battery 630 or a connection to external power. In a further embodiment the apparatus 600 comprises a user interface unit 640 comprising for example a display or a touch display for interaction with a user.

Figure 6B:
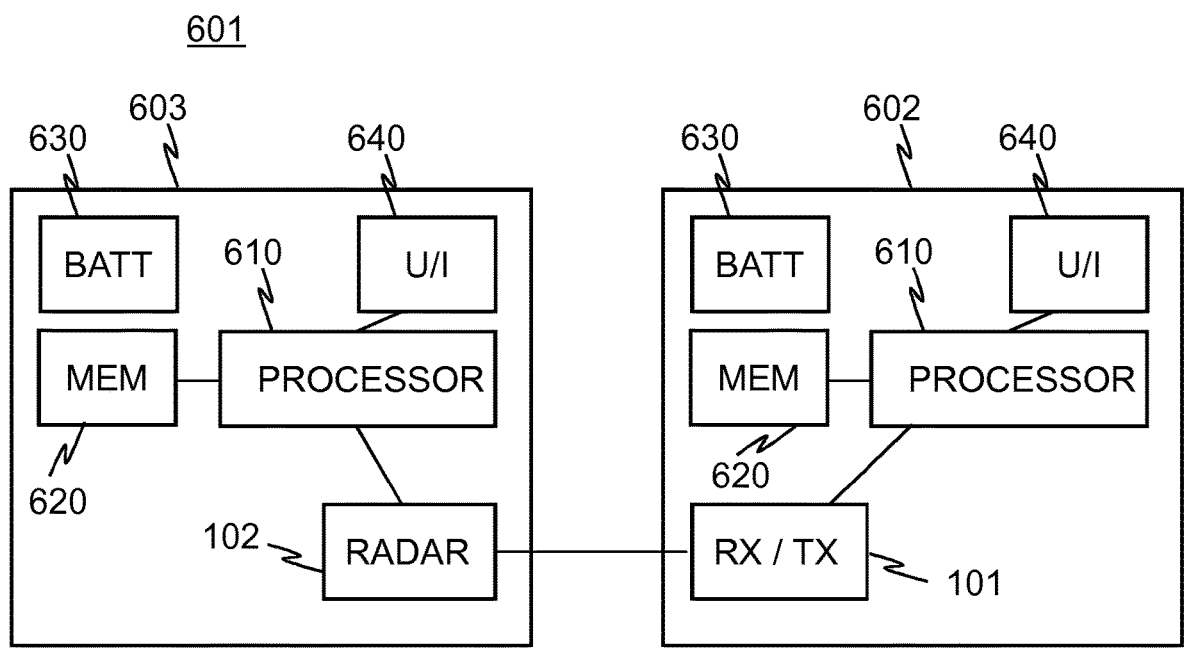
FIG. 6B shows a schematic block view of an arrangement according to an example embodiment.

In an e FIG. 6B shows an example arrangement 601 of a joint communication and radar system that comprises separate communication device 602 and radar device 603. The communication device 602 comprises a communication unit 101 and the radar device 603 comprises a radar unit 102. The communication unit 101 and the radar unit 102 comprise interfaces configured to interact with each other to provide functionality of one or more embodiments disclosed herein. The communication device 602 may be a mobile device or some other handheld or portable communication device or a stationary communication device.

The communication device 602 further comprises electronics configured to control the operations of the communication device, to carry out calculations and to cause carrying out the steps of the method according to the embodiments of the embodiment. The communication device 602, in an embodiment, comprises a memory 620 and a processor 610. The processor 610 is, in an embodiment, configured to co-operate with the radio communication unit 101 and to cause storing data into the memory 620. The processor 610 may be further configured to cause controlling of the operation of the communication device 602 using a non-transitory computer program code stored in the memory 620.

The radar device 602 further comprises electronics configured to control the operations of the radar device, to carry out calculations and to cause carrying out the steps of the method according to the embodiments of the embodiment. The radar device 603, in an embodiment, comprises a memory 620 and a processor 610. The processor 610 is, in an embodiment, configured to co-operate with the radar unit 102 and to cause storing data into the memory 620. The processor 610 may be further configured to cause controlling of the operation of the radar device 602 using a non-transitory computer program code stored in the memory 620. In an embodiment, the processor 610 is configured to carry out at least in part the calculations of the radar unit 102.

In a still further embodiment, the apparatus 600 or the arrangement 601 of FIGS. 6A and 6B is comprised in a moving object such as a vehicle (e.g. a car, a ship, an airplane, or a drone), or in a stationary object such as stand-alone radar, a traffic surveillance system or a base station of a communication network.

Some use cases relating to example embodiments, are presented in the following. Radar according to various embodiments may be used for providing a joint communication and radar system for autonomous vehicles such a self-driving cars, trucks, drones, ships etc. Such autonomous vehicles require at the same time situational awareness while exchanging information. In addition to communicating sensor data, communication facilities are needed for receiving maps, safety messages, infotainment, and for receiving information about surrounding environment (e.g. what is behind the curves, corners, and hills). Radars can be reliably operated in different weather conditions, both in bright sunlight and at might. Therefore radars suit well for autonomous vehicles or partially autonomous vehicles. It is to be noted though that various embodiments are not limited to use in autonomous systems. Instead various example embodiments can be used in any system requiring both communication functionality and radar functionality.

Figures 7, 8:
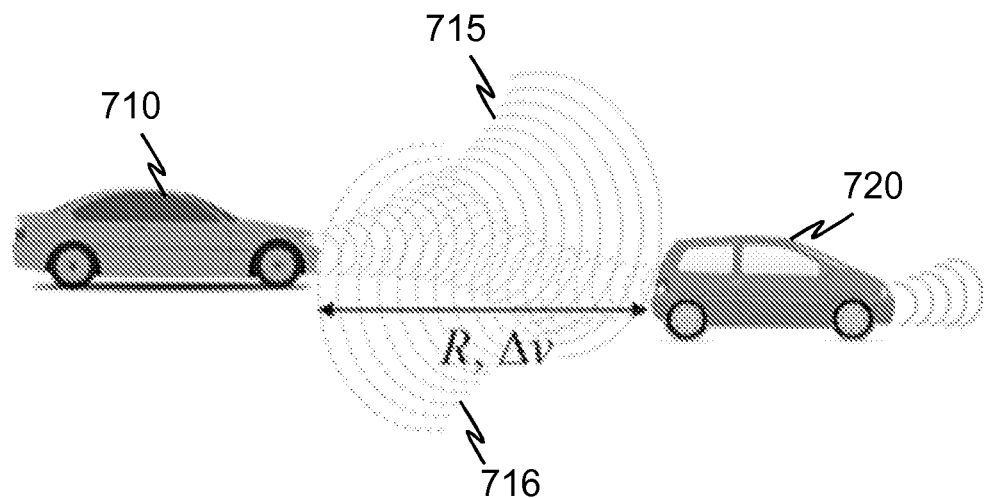
FIG. 7 illustrates a use case according to an example embodiment.
FIG. 8 shows a table of estimated radar range resolutions.

FIG. 7 illustrates one use case according to an example embodiment. FIG. 7 shows two cars 710 and 720. The cars 710 and 720 comprise a radar according to one of the foregoing embodiments. In operation, radar in car 710 transmits signal 715 and signal 716 reflects back from car 720. Based on the reflected signal 716, the radar in car 710 can calculate distance R between the cars 710 and 720 and relative velocity Δv of the car 720.

FIG. 8 shows a table of estimated radar range resolutions with different 4G and 5G bandwidths. In 4G/LTE systems the range resolution can be 8.3 m and in 5G systems the range resolution can be between 0.1-3.0 m.

Without in any way limiting the scope, interpretation, or application of the claims appearing below, a technical effect of one or more of the example embodiments disclosed herein is increasing use of common components between radar and communication systems. Including a radar according to various example embodiments in a communication device does not necessarily require any additional hardware components. Another technical effect of one or more of the example embodiments disclosed herein is that integration possibilities are increased. Integration may lead to cost savings and reduction in energy consumption. Yet another technical effect of one or more of the example embodiments disclosed herein is that global shortage of spectrum can be relaxed as same bandwidth can be used simultaneously for different purposes (radar and communications). These have a positive effect on enabling rapid uptake of new systems and standards.

Another technical effect of one or more of the example embodiments disclosed herein is that radar according to various example embodiments does not increase complexity of the system as existing frequency estimation and synchronization signal detection correlators of the communication system are employed in the radar for velocity and range estimation. The provided solution is straightforward to implement and does not require complex calculations. For example, channel estimation is not needed in the radar implementation according to various example embodiments.

Another technical effect of one or more of the example embodiments disclosed herein is improved security as the communication system based radar exhibits inherent authentication.

Although various aspects of the disclosed embodiments are set out in the independent claims, other aspects of the disclosed embodiments comprise other combinations of features from the described embodiments and/or the dependent claims with the features of the independent claims, and not solely the combinations explicitly set out in the claims.

It is also noted herein that while the foregoing describes example of the disclosed embodiments, these descriptions should not be viewed in a limiting sense. Rather, there are several variations and modifications which may be made without departing from the scope of the disclosed embodiments as defined in the appended claims.

The invention claimed is:

1. A Radar, comprising;
an interface configured to:
receive a frequency estimation output from a first correlator of a receiver path of a radio communication device, wherein the frequency estimation output is for frequency correction in the receiver path of the radio communication device; and
receive a synchronization signal correlation output from a second correlator of the receiver path of the radio communication device, wherein the synchronization signal correlator output is for timing adjustment in the receiver path of the radio communication device;
wherein the radio communication device is a multi-carrier orthogonal frequency-division multiplexing (OFDM) device, and wherein the synchronization signal is a primary synchronization signal (PSS) of the radio communication device; and
the radar further comprises a processing block configured to use the received frequency estimation output for velocity estimation and to use the synchronization signal correlation output for range estimation.

2. The radar of claim 1, wherein the processing block is configured to calculate a range estimate based on a correlation peak of the synchronization signal correlation output.

3. The radar of claim 1, wherein the processing block is configured to calculate a velocity estimate based on the frequency estimation output at the moment of a correlation peak of the synchronization signal correlation output.

4. The radar of claim 1, wherein the radio communication device is a 4G or 5G communication device.

5. The radar of claim 1, wherein the synchronization signal is a predefined known signal.

6. A joint communication and radar system comprising radar that comprises:
an interface configured to:
receive a frequency estimation output from a first correlator of a receiver path of a radio communication device, wherein the frequency estimation output is for frequency correction in the receiver path of the radio communication device; and receive a synchronization signal correlation output from a second correlator of the receiver path of the radio communication device, wherein the synchronization signal correlation output is for timing adjustment in the receiver path of the radio communication device:

wherein the radio communication device is a multi-carrier orthogonal frequency-division multiplexing (OFDM) device, and wherein the synchronization signal correlation output is a primary synchronization signal (PSS) of the radio communication device; and the radar further comprises a processing block configured to use the received frequency estimation output for velocity estimation and the synchronization signal correlation output for range estimation.

7. A vehicle comprising radar that comprises:

an interface configured to:

receive a frequency estimation output from a first correlator of a receiver path of a radio communication device, wherein the frequency estimation output is for frequency correction in the receiver path of the radio communication device; and receive a synchronization signal correlation output from a second correlator of the radio communication device, wherein the synchronization signal correlation output is for timing adjustment in the receiver path of the radio communication device, wherein the radio communication device is a multi-carrier orthogonal frequency-division multiplexing (OFDM) device, and wherein the synchronization signal is a primary synchronization signal (PSS) of the radio communication device; and the radar further comprises a processing block configured to use the received frequency estimation output for velocity estimation and the synchronization signal correlation output for range estimation.

8. A method in radar, comprising receiving a frequency estimation output from a first correlator of a receiver path of a radio communication device, wherein the frequency estimation output is for frequency correction in the receiver path; and receiving a synchronization signal correlation output from a second correlator of the receiver path of the radio communication device, wherein the synchronization signal correlation output is for timing adjustment in the receiver path , wherein the radio communication device is a multi-carrier orthogonal frequency-division multiplexing (OFDM) device, and wherein the synchronization signal is a primary synchronization signal, PSS, of the radio communication device; and using the received frequency estimation output for velocity estimation and the received synchronization signal correlation output for range estimation.

9. The method of claim 8, further comprising calculating a range estimate based on a correlation peak of the synchronization signal correlation output.

10. The method of claim 8, further comprising calculating a velocity estimate based on the frequency estimation output at the moment of a correlation peak of the synchronization signal correlation output.

11. The radar of claim 1, wherein the processing block is configured to calculate the velocity estimate based on an uncorrected frequency estimate and the range estimate based on a correlation result calculated with the frequency corrected signal.

12. The radar of claim 1, wherein the frequency estimation output is a signal used as frequency estimate for frequency correction in the receiver path of the radio communication device, and the synchronization signal correlation output is a signal used for timing adjustment in the receiver path of the radio communication device.

13. The radar of claim 1, wherein the frequency estimation output and the synchronization signal correlation output for the radar are taken from the receiver path of the radio communication device prior to the FFT operation.

14. The joint communication and radar system according to claim 6, wherein the frequency estimation output and the synchronization signal correlation output for the radar are taken from the receiver path of the radio communication device prior to the FFT operation.

15. The vehicle according to claim 7, wherein the frequency estimation output and the synchronization signal correlation output for the radar are taken from the receiver path of the radio communication device prior to the FFT operation.

16. The method according to claim 8, wherein the frequency estimation output and the synchronization signal correlation output for the radar are taken from the receiver path of the radio communication device prior to the FFT operation.

17. The radar of claim 1, wherein the processing block comprises:

a delay estimation block configured to calculate a delay estimate based on the synchronization signal correlation output; and a range estimation block configured to calculate range based on the delay estimate.

18. The radar of claim 1, wherein the processing block comprises:

a phase estimation block configured to calculate a phase estimate based on the frequency estimation output; and a velocity estimation block configured to calculate relative velocity based on the phase estimate.

* * * * *